United States Patent
Ling et al.

(10) Patent No.: US 10,324,179 B2
(45) Date of Patent: Jun. 18, 2019

(54) MULTISTATIC RADAR VIA AN ARRAY OF MULTIFUNCTIONAL AUTOMOTIVE TRANSCEIVERS

(71) Applicant: Maxlinear, Inc., Carlsbad, CA (US)

(72) Inventors: Curtis Ling, Carlsbad, CA (US); Stefan Szasz, Carlsbad, CA (US)

(73) Assignee: Maxlinear, Inc., Carlsbad, CA (US)

( * ) Notice: Subject to any disclaimer, the term of this patent is extended or adjusted under 35 U.S.C. 154(b) by 522 days.

(21) Appl. No.: 15/142,926

(22) Filed: Apr. 29, 2016

(65) Prior Publication Data

US 2016/0320481 A1    Nov. 3, 2016

Related U.S. Application Data

(60) Provisional application No. 62/155,728, filed on May 1, 2015.

(51) Int. Cl.

| | |
|---|---|
| *G01S 13/93* | (2006.01) |
| *G01S 7/00* | (2006.01) |
| *G01S 13/02* | (2006.01) |
| *G01S 13/42* | (2006.01) |
| *G01S 13/87* | (2006.01) |
| *G01S 7/40* | (2006.01) |
| *G01S 13/89* | (2006.01) |
| *G01S 13/60* | (2006.01) |
| *G01S 13/86* | (2006.01) |

(52) U.S. Cl.
CPC ............ *G01S 13/931* (2013.01); *G01S 7/006* (2013.01); *G01S 7/4004* (2013.01); *G01S 13/0209* (2013.01); *G01S 13/42* (2013.01); *G01S 13/87* (2013.01); *G01S 13/89* (2013.01); *G01S 13/60* (2013.01); *G01S 13/86* (2013.01); *G01S 2013/9375* (2013.01); *G01S 2013/9378* (2013.01); *G01S 2013/9382* (2013.01); *G01S 2013/9385* (2013.01); *G01S 2013/9389* (2013.01); *G01S 2013/9392* (2013.01)

(58) Field of Classification Search
CPC .............................. G01S 7/006; G01S 7/4004
USPC .......................................................... 342/59
See application file for complete search history.

(56) References Cited

U.S. PATENT DOCUMENTS

| | | | | |
|---|---|---|---|---|
| 6,545,633 | B1* | 4/2003 | Jensen | G01S 13/003 342/118 |
| 8,441,393 | B2* | 5/2013 | Strauch | G01S 7/006 342/118 |
| 2008/0211708 | A1* | 9/2008 | Haberland | G01S 7/4004 342/27 |

* cited by examiner

*Primary Examiner* — Peter M Bythrow
*Assistant Examiner* — Helena H Seraydaryan
(74) *Attorney, Agent, or Firm* — McAndrews, Held & Malloy

(57) ABSTRACT

A first multifunction radar transceiver comprises a first transmitter and a first receiver. The transmitter is operable to transmit a first radar burst. The receiver is operable to receive reflections of the first radar burst and reflections of a second radar burst transmitted by a second multifunction radar transceiver. The receiver is operable to generate, based on characteristics of the received reflections of the first radar burst and the received reflections of the second radar burst, a first scene representation. The receiver is operable demodulate the second radar burst to recover a second scene representation. The receiver is operable to combine the first scene representation and the second scene representation to generate a composite scene representation.

56 Claims, 10 Drawing Sheets

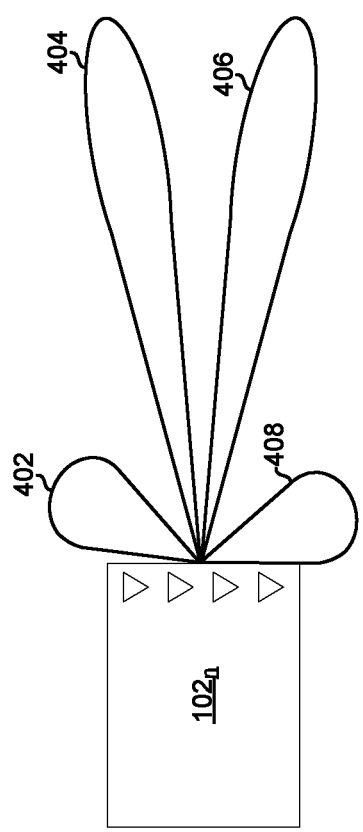

MULTISTATIC RADAR VIA AN ARRAY OF MULTIFUNCTIONAL AUTOMOTIVE TRANSCEIVERS

PRIORITY CLAIM

This application claims priority to the following application(s), each of which is hereby incorporated herein by reference:
U.S. provisional patent application 62/155,728 titled "Multistatic Radar via an Array of Multifunctional Automotive Transceivers" filed on May 1, 2015;

INCORPORATION BY REFERENCE

The entirety of each of the following applications is hereby incorporated herein by reference:
U.S. provisional patent application 62/160,316 titled "Scalable Architecture for an Automotive Radar System" filed on May 12, 2015;
U.S. provisional patent application 62/160,015 titled "Calibration of a Multifunctional Automotive Radar System" filed on May 12, 2015;
U.S. provisional patent application 62/154,840 titled "Multifunctional Automotive Radar" filed on Apr. 30, 2015;
U.S. patent application Ser. No. 15/142,935 titled "Multifunctional Automotive Radar" filed on Apr. 29, 2016;
U.S. provisional patent application 62/162,206 titled "Dynamic OFDM Symbol Shaping for Radar Applications" filed on May 15, 2015; and
U.S. provisional patent application 62/167,950 titled "Cooperative and Crowd-Sourced Multifunctional Automotive Radar" filed on May 29, 2015.

BACKGROUND

Limitations and disadvantages of conventional automotive radar systems and methods will become apparent to one of skill in the art, through comparison of such approaches with some aspects of the present method and system set forth in the remainder of this disclosure with reference to the drawings.

BRIEF SUMMARY

Methods and systems are provided for multistatic radar via an array of multifunctional automotive transceivers, substantially as illustrated by and/or described in connection with at least one of the figures, as set forth more completely in the claims.

BRIEF DESCRIPTION OF THE DRAWINGS

FIG. 4 shows an example antenna pattern of the multifunctional radar transceiver of FIG. 2.

DETAILED DESCRIPTION

Figure 1:
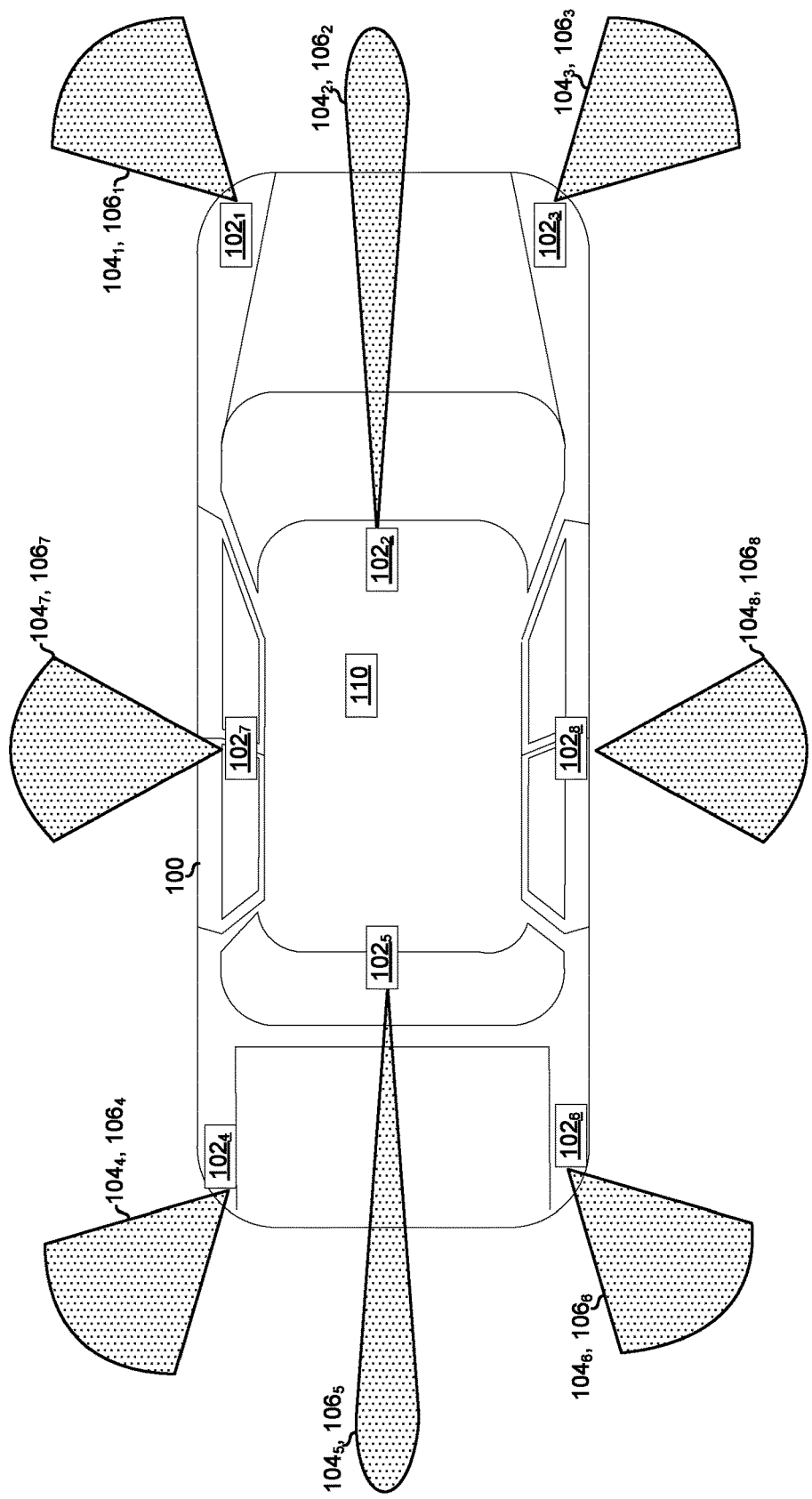
FIG. 1 shows an automobile comprising a plurality of multifunctional radar transceivers.

FIG. 1 shows an automobile comprising a plurality of multifunctional radar transceivers 102 (labeled with subscripts '1' through '8') of an automobile 100 (e.g., a passenger vehicle licensed for use on public roads). Although the example automobile 100 comprises eight transceivers 102 for illustration, any number may be present. Each multifunctional radar transceiver 102 has a corresponding receive antenna pattern 104 and transmit antenna pattern 106 (for clarity of illustration, the transmit and receive patterns are shown as the same, but they need not be). As discussed in further detail in the remainder of this disclosure, the multifunctional radar transceivers 102 may perform: (1) a radar function, (2) a positioning function, and (3) a communication function.

The radar function comprises transmitting millimeter wave signals and processing the reflections/returns of such signals to detect the presence of, identity of, direction of, distance to, and/or speed of objects in the environment surrounding the automobile 100 (the "scene").

The positioning function comprises use of the same millimeter wave signals used for the radar function to improve upon coarse position determined through other mechanisms such as GPS.

The communication function comprises communicating data among the multifunction radar transceivers 102 using of the same millimeter wave signals as are used for the radar function. Such data may include, for example, pixel or voxel data (and time and position metadata) generated using the radar and positioning functions.

Through a combination of the radar function, the positioning function, and the communication function, the multifunctional radar transceivers $102_1$-$102_8$ are operable to generate a scene representation (e.g., 2D pixel grid or 3D voxel grid) where the absolute time of capture of the scene representation and/or the absolute position of the pixels (2D) or voxels (3D) in the scene representation are known.

The circuitry 110 represents other circuitry of the automobile 100 such as one or more transceivers (e.g., cellular, Wi-Fi, Bluetooth, GPS, etc.), instrumentation (e.g., entertainment system, driver indicators/gauges, driver controls), sensors for safety systems, etc. The circuitry 110 may be communicatively coupled to the transceivers 102 via a CANbus, for example. The circuitry 110 may be operable to process data from the transceivers and take action (e.g., trigger driver alerts, transmit messages via one or more of its transceivers, trigger braking or other safety systems, etc.) in response to such data. The circuitry 110 may also generate data which it may pass to the transceiver(s) 102 for communication to a remote transceiver 102 (e.g., that is mounted to another automobile and/or to infrastructure such the road, sign post, stop-light, etc.) In an example implementation, the circuitry 110 may comprise a cell phone that connects to an electronics system of the automobile 100 via USB, Bluetooth, Wi-Fi, or any other suitable interface and then the electronics system 110 of the automobile 100 leverages the cellular transceiver of the circuitry 110 for connecting to a cellular network.

Figure 2A:
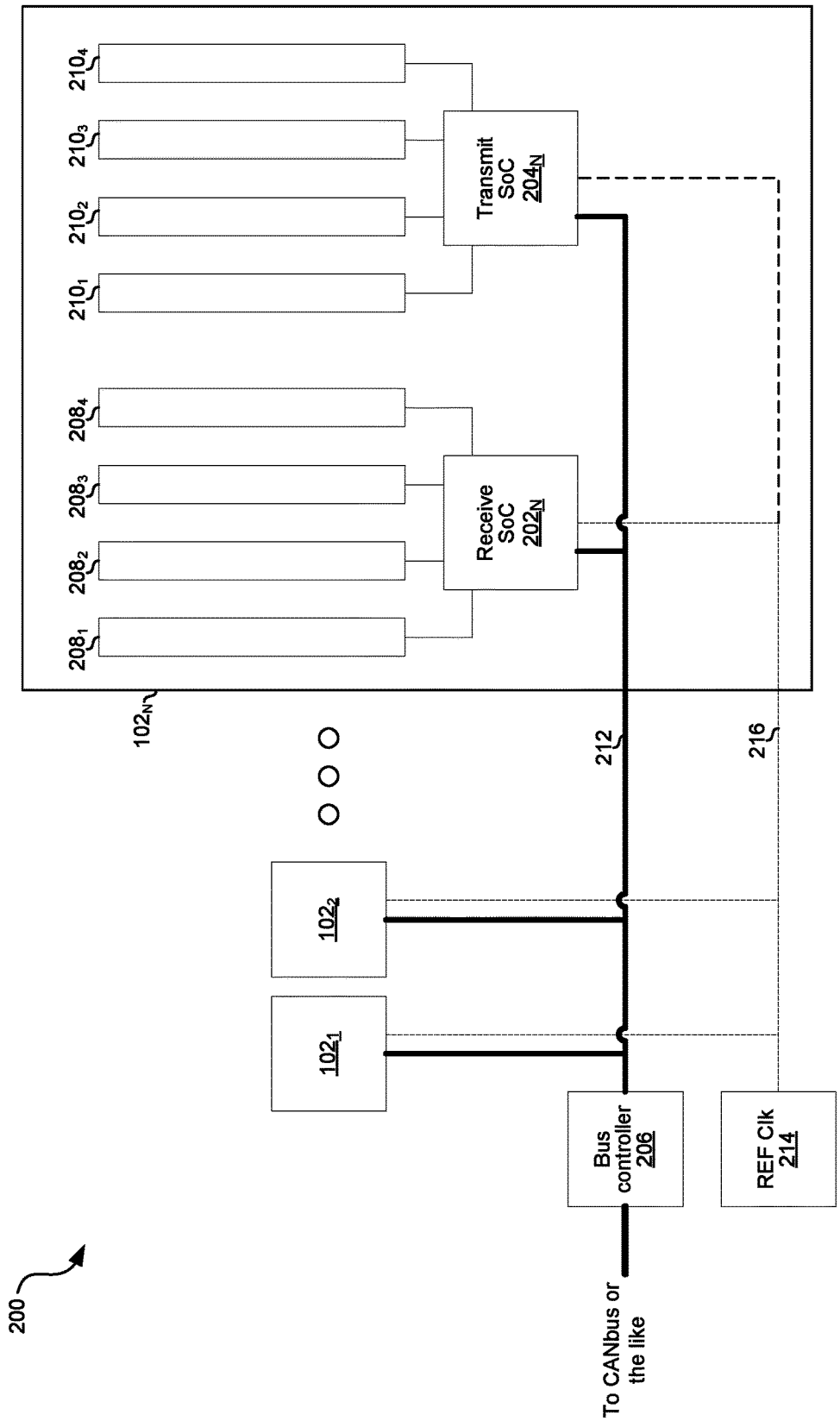
FIG. 2A shows an example architecture of a multifunctional radar system of an automobile.

FIG. 2A shows an example architecture of a multifunctional radar system of an automobile. The example multifunctional radar system 200 comprises N multifunction radar transceivers 102, a bus controller 206, a reference clock generator 214, data bus 212, and clock distribution bus 216. For clarity of illustration, example implementation details are shown for only the $N^{th}$ transceiver ($102_N$), but the other transceivers $102_1$-$102_{N-1}$ may be the same. Each multifunctional radar transceiver $102_n$ (the subscript 'n' used here to generically represent each of the transceivers $102_1$-$102_N$ individually) comprises a receive SoC $202_n$, a transmit SoC $204_n$, a plurality of receive antenna elements 208 (labeled with subscripts 1 through 4, where four was chosen arbitrarily for illustration but any number greater than one may be used), and a plurality of transmit antenna elements 210 (labeled with subscripts 1 through 4, where four was chosen arbitrarily for illustration but any number greater than one may be used, and the number of transmit antenna elements need not match the number of receive antenna elements). In an example implementation, each of the multifunctional radar transceivers 102 comprises one or more CMOS dies on a printed circuit board. In an example implementation, each of the receive SoCs $202_N$, the transmit SoC $204_N$, the bus controller 206, and the reference clock generator 214 is a separately packaged CMOS integrated circuit.

Each of the receive antenna elements $208_1$-$208_4$ comprises, for example, a copper microstrip patch antenna on a printed circuit board (e.g., FR4, Duroid, or the like). Although four elements 208 are shown for illustration, any number may be used.

Each receive SoC $202_n$ is operable to receive millimeter wave signals (e.g., in the 76 to 81 GHz band) via the antenna elements $208_1$-$208_4$. The receive SoC $202_n$ is operable to process received millimeter wave signals for supporting the radar, positioning, and communication functions. The receive SoC $202_n$ is also operable to communicate over data bus 212 and to synchronize its timing to a signal output by reference clock 214 onto clock distribution bus 216. Additional details of an example receive SoC $202_n$ are described below with reference to FIG. 2B.

Each of the transmit antenna elements 210 comprises, for example, a copper microstrip patch antenna on a printed circuit board (e.g., FR4, Duroid, or the like). Although four elements 210 are shown for illustration, any number may be used.

The transmit SoC $204_n$ is operable to transmit millimeter wave signals (e.g., in the 76 to 81 GHz band) via the antenna elements $210_1$-$210_4$. The transmit SoC $204_n$ is operable to generate the signals in such a manner as to support the radar, positioning, and communication functions. The transmit SoC $204_n$ is also operable to communicate over data bus 212 and to synchronize its timing to a signal output by reference clock 214 onto clock distribution bus 216. Additional details of an example transmit SoC $204_n$ are described below with reference to FIG. 2C.

The bus controller 206 is operable to relay data between the data bus 212 interconnecting the multifunction radar transceivers $102_1$-$102_N$ and a data bus of the automobile 100 (e.g., a CAN bus). The bus 212 may, for example, be a high speed serial bus and the bus controller 206, receive SoC $202_n$, and transmit SoC $204_n$ may each be operable to perform serialization and deserialization for communicating over the bus 212.

The reference clock generator 212 comprises a crystal oscillator, phase locked loop, and/or other circuitry for generating a signal to act as a phase reference for receive SoC $202_n$ and transmit SoC $204_n$. In an example implementation, the frequency of the reference signal may be relatively low compared to the millimeter wave frequencies (e.g., on the order of tens or hundreds of MHz), which may greatly relax the routing requirements for the bus 216 as compared to trying to distribute a reference signal in the 77 to 81 GHz range. In another example implementation, the frequency of the reference signal may be the same as the millimeter wave carrier frequency (e.g., it the range 77 to 81 GHz).

Figure 2B:
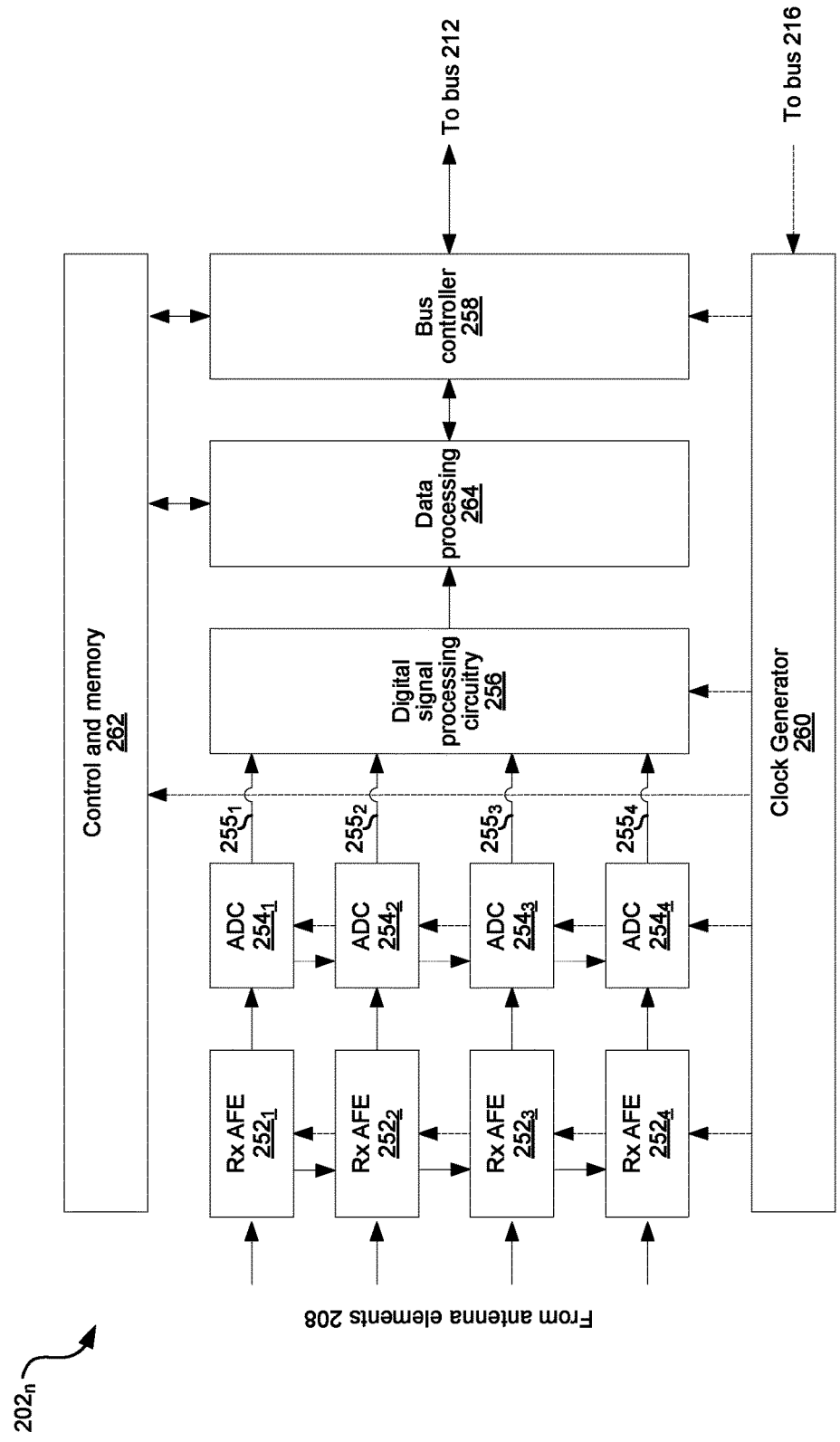
FIG. 2B shows an example implementation of a receiver system on chip (SoC) of a multifunctional radar transceiver of FIG. 2A.

FIG. 2B shows an example implementation of a receiver system on chip (SoC) of the multifunctional radar transceiver of FIG. 2A. The example receive SoC $202_n$ comprises a plurality (a number corresponding to the number of receive antenna elements 208) of receive analog front ends (Rx AFEs) 252, a plurality of analog-to-digital converters (ADCs) 254, digital signal processing circuitry 256, data processing circuitry 264, bus controller circuitry 258, clock generation circuitry 260, and control and memory circuitry 262.

Each of the Rx AFEs 252 is operable to process a millimeter wave signal (e.g., in the band from 76 to 81 GHz) from a respective one of the plurality of antenna elements 208. The processing may comprise, for example, low noise amplification, filtering, and down-conversion so as to output a 1 to 5 GHz wide intermediate frequency or baseband signal.

Each of the ADCs 254 is operable to digitize the output of a corresponding one of the Rx AFEs 252. For example, each Rx AFE 252 may downconvert a received 76 to 77 GHz band to a 1 GHz wide baseband signal which the corresponding ADC 254 may then digitize to generate a 1 GHz wide digital signal. As another example, each Rx AFE 252 may downconvert a received 76 to 81 GHz band to a 5 GHz wide baseband signal which the corresponding ADC 254 may then digitize to generate a 5 GHz wide digital signal 255.

The digital signal processing circuitry 256 is operable to process the digitized signals from the plurality of ADCs 254 to recover information conveyed by the received signals. Such information may be conveyed by characteristics (e.g., latency, Doppler shift, signal strength, etc.) of the received signals, as is the case in a conventional radar system, and/or may be data that was modulated onto the received signals.

The processing performed by the digital signal processing circuit 256 may comprise, for example, channel estimation and equalization.

The processing performed by the digital signal processing circuit 256 may, where the millimeter wave signals are modulated by a data signal, comprise demodulation. For example, the millimeter wave signals transmitted by transceivers 102 may comprise bursts (or "chirps") whose amplitude is modulated relatively slowly as compared to the channel frequency (e.g., a few MHz as compared to a channel frequency of 76-81 GHz), and the digital signal processing circuitry 256 may be operable to track the signal envelope to recover the data signal. As another example, the millimeter wave signals transmitted by transceivers 102 may comprise OFDM symbols and the digital signal processing circuit 256 may be operable to demodulate the received signals using a discrete Fourier transform. The digital signal processing circuit 256 may then be operable to demap the modulated signal according to one or more symbol constellations, deinterleave the demapped bits, and decode the demapped bits. The recovered bits may then be provided to the control and memory subsystem 262 and/or output onto the bus 212.

The processing performed by the digital signal processing circuit 256 may comprise beamforming. The beamforming may comprise time-domain beamforming in which one or more sets of phase and amplitude coefficients is applied to each of the signals 255 in the time domain. Alternatively, or additionally, the beamforming may comprise frequency-domain beamforming in which the signals 255 are first transformed to the frequency domain (e.g., via a DFT) and then each subband (e.g., each OFDM bin or group of OFDM bins) is processed using a corresponding one or more beamforming matrices determined for that subband. In this manner, different subbands may be communicated on beams pointed in different directions.

The processing performed by the digital signal processing circuit 256 may comprise spectral analysis of the received signals. The spectral analysis may comprise, for example, mixing received signals with one or more transmitted signals to generate a difference signal. The spectral analysis may comprise, for example, performing a discrete Fourier transform on received signals. The spectral analysis may be used to, for example, determine Doppler shift of received signals and/or to generate spectral signatures of detected objects in the scene (i.e., objects off of which the received signals reflected.).

The processing performed by the digital signal processing circuit 256 may comprise separating different transmitted signals (e.g., originating from different ones of the transceivers $102_1$-$102_8$). The may comprise, for example, correlating the received signals with different orthogonal codes and/or pseudorandom sequences used by different ones of the transceivers $102_1$-$102_8$. Alternatively, or additionally, separating different transmitted signals (e.g., to determine which transceiver 102 sent which signal) may comprise directly recovering a respective identifier (e.g., a unique identifier such as a MAC address or similar) modulated onto each of the millimeter wave signals. The ability to distinguish which, if any, energy arrived from each transceivers $102_1$-$102_8$ may be useful for performing the radar function, the positioning function, and the communication function of the transceivers $102_1$-$102_8$. For the radar and positioning functions, for example, the identification of which of transceivers $102_1$-$102_8$ sent any particular received signal may be used for determining the position and angle from which the signal was transmitted (since the different transceivers $102_1$-$102_8$ are at different positions on the automobile 100), which may be used for determining precise distance to, and location of, objects in the scene. For the communication function, for example, the identification of which of transceivers $102_1$-$102_8$ sent any particular received signal may be used in a manner similar to a "from" address in many networking protocols.

The data processing circuitry 264 is operable to process data output by the digital signal processing circuitry 256. Such processing may comprise, for example, implementing algorithms to generate a representation of the scene detected using the radar function. Based on the angle, strength, timing, spectral content, and/or other characteristics of the received signals, the data processing circuitry 264 may generate a 2D pixel grid or 3D voxel grid. In an example implementation, each pixel or voxel may indicate an absolute position to which it corresponds (determined via the positioning function of the multifunction radar system), the strength of returns, if any, received from that location (determined via the radar function of the multifunction radar system), spectral content of returns, if any, received from that location, and/or time(s) at which returns were received from that location and/or at which the pixel or voxel data was updated.

The data processing circuitry 264 may also be operable to process data received from the data bus 212. For example, positioning information may be received via the bus 212 (e.g., GPS coordinates from a GPS receiver of the vehicle 100) and combined with data recovered from the digital processing circuitry 264 for performing the positioning function. For example, scene representations from other radar transceivers 102 may be received via the data bus 212 and the data processing circuitry 260 may use such scene(s) along with its scene generated from the output of digital signal processing circuitry 256 to generate a composite scene representation. Such a representation may have the benefit of radar returns arriving from multiple angles (i.e., "seeing" the object from multiple perspectives since the various transceivers 102 are located on different locations on the automobile).

The processing performed by data processing circuitry 264 of data output by digital signal processing circuitry 256 may comprise, for example, preparing data for output onto the data bus 212. For example, a scene representation generated from the output of the digital signal processing circuitry 256 may be transmitted onto the data bus 212.

The bus controller circuitry 258 may be substantially similar to the bus controller 206 described above.

The clock generation circuitry 260 is operable to generate a plurality of timing signals that are synchronized to the timing signal received via bus 216. The timing signals may comprise, for example: a local oscillator signal for direct downconversion of received millimeter wave signals (e.g., in the 76 to 81 GHz range), a sampling clock for the ADCs 254 (e.g., between 2 and 20 GHz), and one or more clocks for clocking the digital processing circuitry 256, the bus controller 258, and the control and memory subsystem 262.

The control portion of subsystem 262 is operable to manage operations of the receiver SoC $202_n$ (e.g., implement a state machine and/or other control logic that controls the configuration of the other components of the receive SoC $202_n$). The control portion of subsystem 262 may, for example, configure beamforming matrices used by the digital signal processing circuitry 256. For example, the control portion of subsystem 262 may determine that particular directions are of interest at a given time and may configure the beamforming to point beams in those particular directions. Particular directions may be of interest because, for example, it is desired to determine more information about objects located in that direction and/or to listen for communications from other transceivers 102 that are likely to come from that direction. Directions of interest may be determined based on, for example, data received via the data bus, data carried in previously received millimeter wave signals, and/or previously generated scene representations.

The memory portion of subsystem 262 is operable to store relatively large amounts (e.g., hundreds of megabits) of information of a variety of forms. For example, beamforming matrices, an identifier of the transceiver 102, scrambling codes, and messages received from (via data bus 212) and/or to be communicated to (via data bus 212 and/or via millimeter wave signals) other transceivers are just some examples of the information which may be stored in the memory and readily accessible to the SoC $202_n$.

Figure 2C:
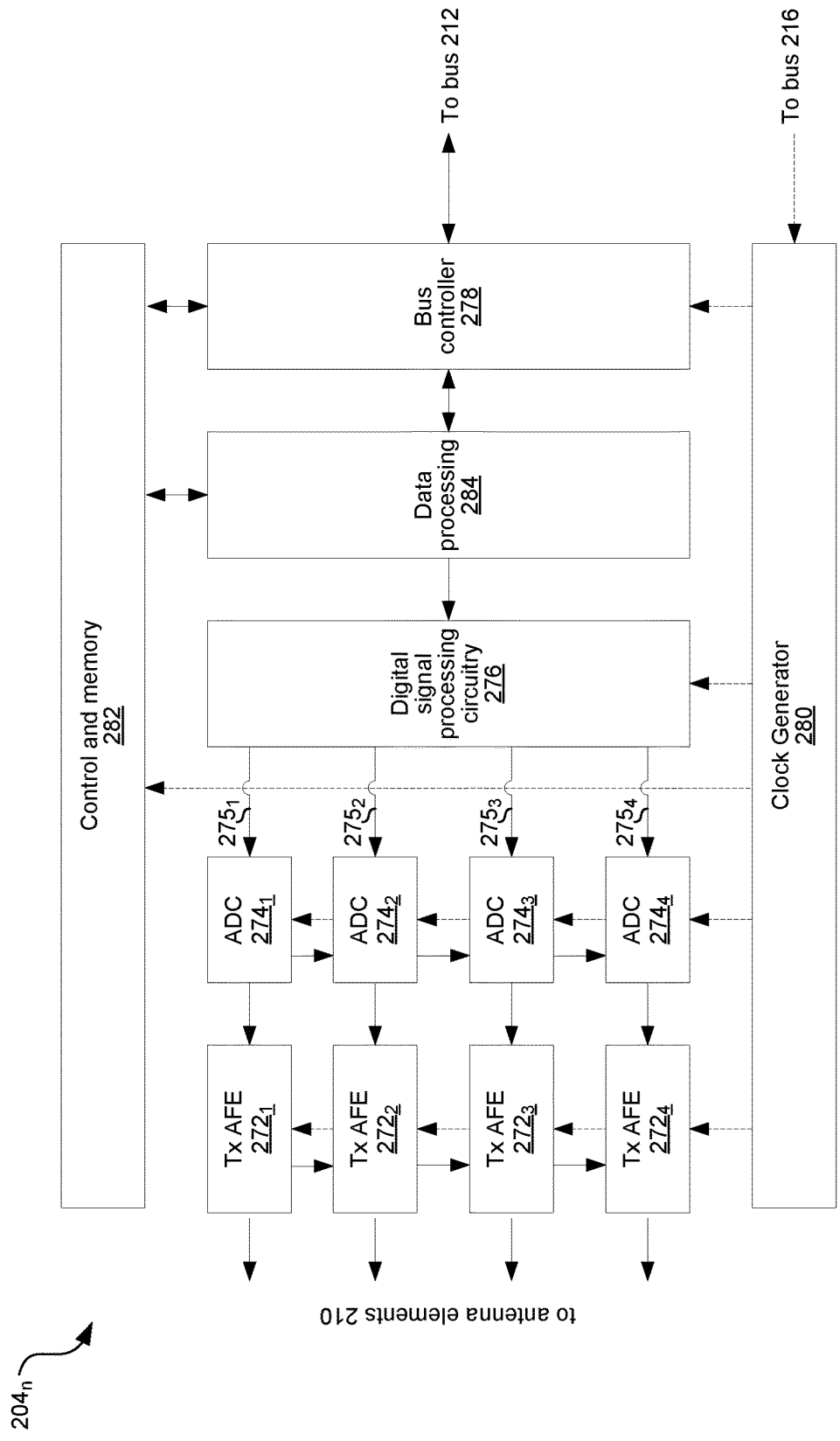
FIG. 2C shows an example implementation of a transmitter system on chip (SoC) of a multifunctional radar transceiver of FIG. 2A.

FIG. 2C shows an example implementation of a transmitter system on chip (SoC) of the multifunctional radar transceiver of FIG. 2A. The example transmit SoC $204_n$ comprises a plurality of transmit analog front ends (Tx AFEs) 272, a plurality of analog-to-digital converters (ADCs) 254, digital signal processing circuitry 276, data processing circuitry 284, bus controller circuitry 278, clock generation circuit 280, and control and memory subsystem 282.

Each of the Tx AFEs 272 is operable to receive an analog baseband signal from a respective one of ADCs 274, upconvert the signal to a millimeter wave (e.g., a 1 GHz to 5 GHz wide signal in the band from 76 to 81 GHz), and amplify the millimeter wave signal for output to a respective one of antenna elements $210_1$-$210_4$.

Each of the ADCs 274 is operable to convert a digital signal 275 from the digital signal processing circuitry 276 to an analog representation. For example, each signal 275 may be a 1 GHz to 5 GHz wide baseband signal.

The digital signal processing circuitry 276 is operable to process one or more data streams from data processing circuitry 284 to generate a plurality (four in the example shown) of digital baseband signals 275. Processing performed by digital signal processing circuitry 276 may comprise, for example, encoding, interleaving, bit-to-symbol mapping, frequency mapping (mapping of symbols to subbands), modulation (e.g., using discrete Fourier transform and/or inverse discrete Fourier transform) beamforming, and/or the like.

The processing performed by the digital signal processing circuit 276 may comprise generating modulated signals $275_1$-$275_4$ and/or generating a data signal to be modulated onto a carrier. As an example of the former case, the digital signal processing circuit 276 may output a continuous wave signal, or a chirp whose amplitude is modulated by a data signal whose frequency is relatively low (e.g., a few MHz) as compared to the channel frequency (e.g., between 76 GHz and 81 GHz). As another example of the former case, the digital signal processing circuit 276 may output an OFDM signal. As an example of the latter case, the digital signal processing circuit 276 may output a relatively low bandwidth data signal (e.g., a few MHz) which may modulate a millimeter wave chirp generated by the clock generator 280.

The processing performed by the digital signal processing circuit 276 may comprise beamforming. The beamforming may comprise time-domain beamforming and/or frequency-domain beamforming.

Data processing circuit 284 is operable to generate one or more data signals for modulation onto the millimeter wave signals transmitted by the SoC $204_n$. The data signals may, for example, be read from memory of the SoC $202_n$ (e.g., an identifier of the module 102n) and/or generated algorithmically (e.g., timestamps generated based on a clock of the control portion of subsystem 282). Additionally, or alternatively, the data may be received from bus 212 via bus controller 278. The data processing circuit 284 may packetize and/or otherwise format the data.

Bus controller 278 may be substantially similar to the bus controller 206 described above.

Clock generation circuit 280 is operable to generate a plurality of timing signals that are synchronized to the timing signal received via bus 216. The timing signals may comprise, for example: a local oscillator signal for upconversion of baseband signals to millimeter wave signals (e.g., in the 76 to 81 GHz range), a sampling clock for the DACs 274 (e.g., between 2 and 20 GHz), and one or more clocks for clocking the digital processing circuitry 276, the bus controller 278, and the control and memory subsystem 282.

The control portion of subsystem 282 is operable to manage operations of the receiver SoC $204_n$ (e.g., implement a state machine and/or other control logic that controls the configuration of the other components of the receive SoC $204_n$). The control portion of subsystem 282 may, for example, configure beamforming matrices used by the digital signal processing circuitry 276. For example, the control portion of subsystem 282 may determine that particular directions are of interest at a given time and may configure the beamforming to point beams in those particular directions. Particular directions may be of interest because, for example, it may be desirable to determine more information about objects located in that direction and/or to listen for communications from other transceivers 102 that are likely to come from that direction. Directions of interest may be determined based on, for example, data received via the data bus 212, scene scanning algorithms, and/or the like.

The memory portion of subsystem 282 is operable to store relatively large amounts (e.g., hundreds of megabits) of information of a variety of forms. For example, beamforming matrices, and messages received from (via data bus 212 and/or millimeter wave signals) and/or to be communicated to (via data bus 212 and/or modulated onto millimeter wave radar signals) other transceivers are just some examples of the information which may be stored in the memory and readily-accessible to the SoC $204_n$.

Figure 3A:
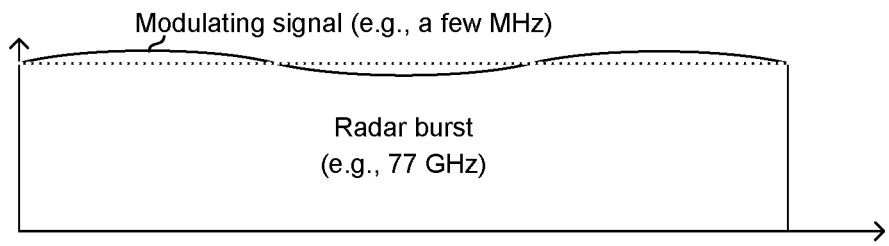
FIGS. 3A and 3B show two example signal formats used by a multifunctional radar transceiver.
Figure 3B:
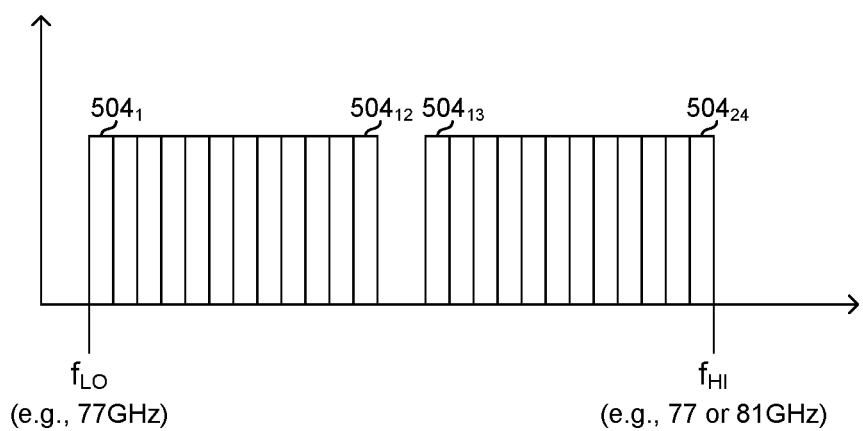

FIGS. 3A and 3B show two example signal formats used by a multifunctional radar transceiver. In FIG. 3A, the millimeter wave signal (e.g., a continuous wave signal or series of frequency ramped "chirps") is amplitude modulated by a relatively slowly varying data signal. In FIG. 3B the millimeter wave signal is an OFDM signal which, for any given burst (frame) may transmit one or more of a plurality of subbands 504 (twenty-four subbands were chosen arbitrarily for illustration, any number may be used). Each of the subbands $504_1$-$504_{24}$ may be a continuous wave or may be modulated by a data signal (e.g., a N-QAM symbol corresponding to $\log_2(N)$ bits of the data signal). Different subbands and/or groups of subbands may be allocated for different purposes (e.g., some for radar, some for positioning, and some for communication). Similarly, using frequency-domain beamforming, different subbands and/or groups of subbands may be pointed in different directions for detecting objects at different locations in the scene and/or for transmitting the data signal in directions (e.g., pointed at different reflection paths leading to different ones of the transceivers $102_1$-$102_8$).

Data modulated onto the millimeter wave signal may be forward error correction encoded for robustness. Data modulated onto the millimeter wave signal may be scrambled or encrypted for security (e.g., to prevent spoofing, sniffing of communications, etc.).

FIG. 4 shows an example antenna pattern of the multifunctional radar transceiver of FIG. 2. For example, for the radar function, lobes 402 and 408 may be used for identifying objects that are relatively close and off to the side of the transceiver $102_n$, and the lobes 404 and 406 may be used for looking further in the distance (e.g., in the direction of travel of the automobile 100 or looking behind the automobile 100). As another example, for the radar function, the lobes 402 and 408 may receive returns from the nearby road surface and the Doppler of such returns may be used for calculating the speed of the automobile 100. As another example, for the communication function, lobes 402 and 408 may be used for directly communicating with another transceiver 102 off to the side of the depicted transceiver $102_n$ and lobes 404 and 406 may be used for communicating with other transceivers 102 by bouncing the signals off of objects in the scene.

Although four beams/lobes are shown for illustration, the multifunctional radar transceivers are not limited to any particular number of beams/lobes. There may be different numbers of beams at different times based on, for example, the number of objects and/or angles of objects it is determined necessary or desirable to identify or track at any given time. There may be different numbers of beams at different times based on, for example, number and/or location of other transceivers 102 with which it is necessary or desirable to communicate at any given time. Similarly, the directions of the beams may vary over time. For example, the directionality of any one or more of the beams 402, 404, 406, and 408 may change periodically, based on what is detected in the scene, based on desired communication to be sent or received, and/or the like.

Figure 5A:
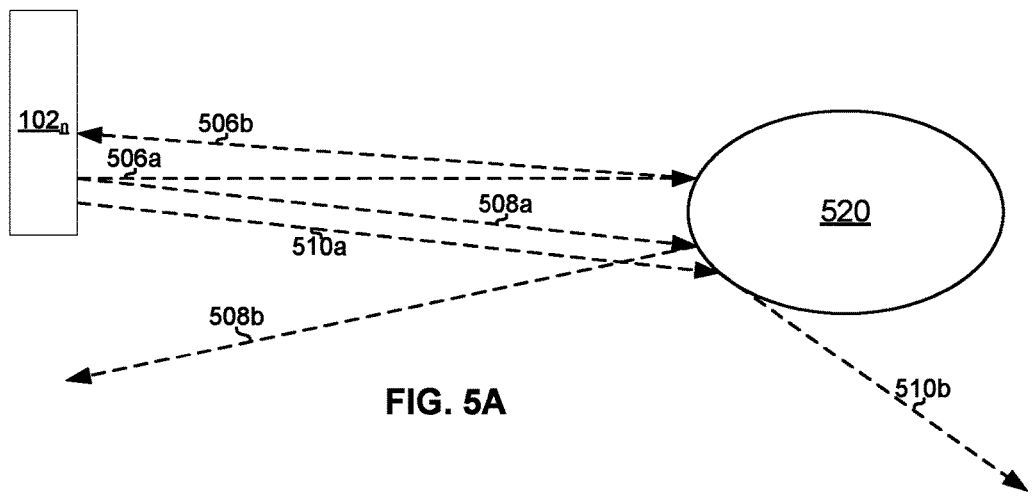
FIGS. 5A and 5B illustrate benefits of multiple multifunction radar transceivers operating cooperatively.
Figure 5B:
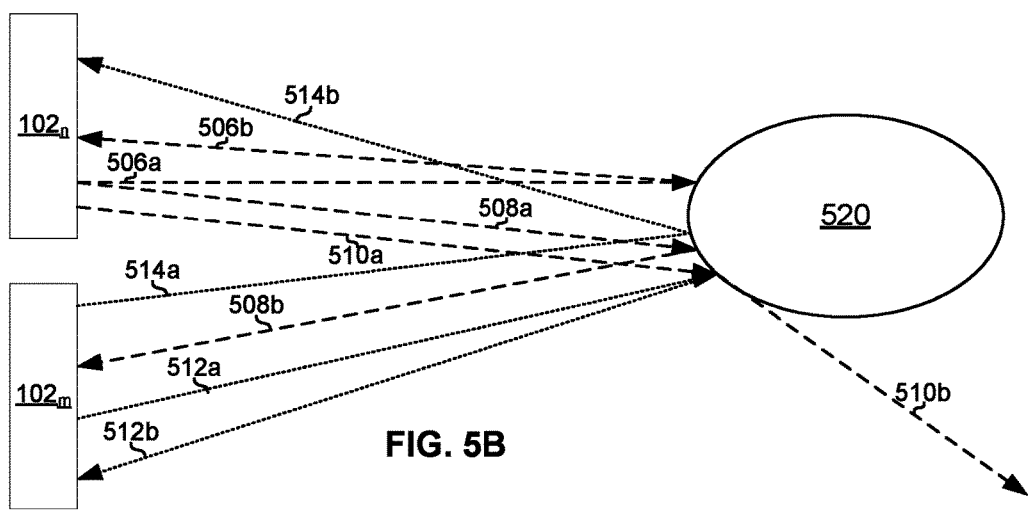

FIGS. 5A and 5B illustrate benefits of multiple multifunction radar transceivers operating cooperatively. In FIGS. 5A and 5B, transceiver $102_n$ transmits one or more millimeter wave signals represented by arrows 506a, 508a, and 510a. Arrow 506b represents a reflection of signal 506a off of object 520. Arrow 508b represents a reflection of signal 508a off of object 520. Arrow 510b represents a reflection of signal 510a off of object 520. In an example implementation, arrows 506a, 508a, and 510a represent paths of a millimeter wave energy transmitted via a single lobe that covers a relatively wide range of angles. In an example implementation, each of arrows 506a, 508a, and 510a represent millimeter wave energy transmitted via a plurality of lobes each of which covers a relatively narrow range of angles. In an example implementation, the arrows 506a, 508a, and 510a represent millimeter wave signals in three different subbands.

In FIG. 5B, transceiver $102_m$ ('m' between 1 and 8 for the example implementation of FIG. 1) transmits one or more millimeter wave signals represented by arrows 512a and 514a. Arrow 512b represents a reflection of signal 512a off of object 520. Arrow 514b represents a reflection of signal 514a off of object 520. Comparison of FIGS. 5A and 5B reveals some advantages of the use of multiple transceivers 102. For example, in FIG. 5A, energy represented by arrow 508b is not received and thus does not contribute the knowledge gathered about object 520. In FIG. 5B, on the other hand, the energy represented by arrow 508b is received by transceiver $102_m$, and thus can provide information about the position, speed, shape, size, and/or other characteristics of the object 520. Similarly, as a result of the transceiver $102_m$ transmitting the millimeter wave radar signals represented by arrows 512a and 514a, reflections 512b and 514b provide additional information about object 520. Thus, for the radar function, the combination of two transceivers $102_n$ and $102_m$ provides for greater collection of reflected energy (improving SNR) as well as a wider angle "view" of the object 520.

Figure 6:
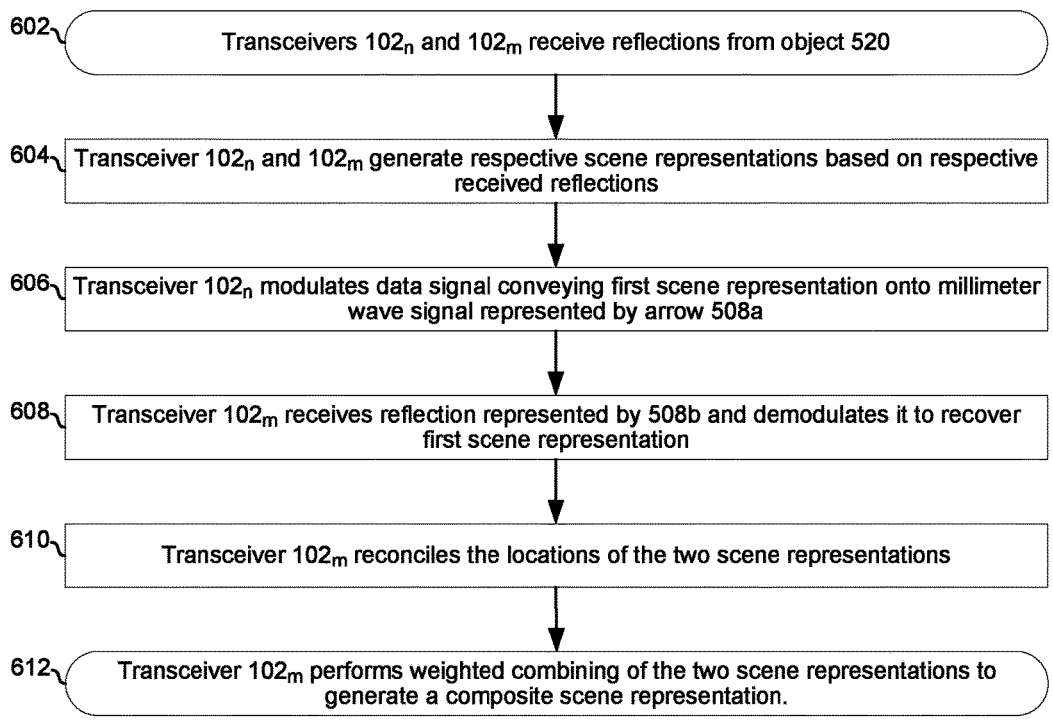
FIG. 6 is a flowchart illustrating generation of scene representation using a plurality of multifunctional radar transceivers.

Furthermore, the configuration of FIG. 5B can take advantage of the communication function supported by the transceivers $102_1$-$102_8$, as described next with reference to FIG. 6.

In block 602, transceiver $102_n$ receives, via reflection off of object 520, first bursts of millimeter wave signals represented by arrows 506a and 514a, and transceiver $102_m$ receives, via reflection off of object 520, first bursts of millimeter wave signals represented by arrows 508a and 512a.

In block 604, transceiver $102_n$ generates a first scene representation based on its received first bursts, and transceiver $102_m$ generates a second scene representation based on its received first bursts.

In block 606, transceiver $102_n$ modulates a data signal conveying the first scene representation onto a second burst of a microwave signal represented by arrow 508a, and transceiver $102_m$ transmits a second burst of a millimeter wave signal represented by arrow 512a.

In block 608, transceiver $102_m$ receives the reflection of the second burst and demodulates it to recover the first scene representation.

In block 610, transceiver $102_m$ reconciles the locations of the two scene representations so they can be combined. That is, since the field of view of the two transceivers is different and/or the two scene representations were captured at slightly different times while the automobile 100 was moving, the same pixel or voxel coordinate (e.g., pixel (0,0) or voxel (0,0,0)) in the two scene representations may not correspond to the same absolute location. Accordingly, the locations of the two scene representations need to be reconciled before they can be combined into a composite scene representation. To use an analogy, combining the two scene representations without first reconciling their positions would result in "double vision."

In block 612, the transceiver $102_m$ performs weighted combining of the two scene representation. Such a combining may comprise, for each pixel or voxel coordinate, determining a relative reliability of the two scene representation and then combining the two pixels or voxels proportional to their reliabilities to generate a single, composite pixel or voxel.

This process may continue indefinitely. For example, the second bursts of the signals may be used by transceiver $102_n$ to generate a third scene representation and by transceiver $102_m$ to generate a fourth scene representation. A third burst may then convey the fourth scene representation to transceiver $102_m$ which may then combine the third and fourth scene representation with each other and/or with the composite scene representation generated in block 612. And the third bursts may be used generate fifth and sixth scene representations, and so on such that the composite scene representation evolves over time.

In another example implementation, the transceiver $102_n$ may transmit a scene representation to the transceiver $102_m$ only after aggregating/averaging the scene representation over multiple received bursts. In other words, each of the first and second scene representations may itself be a composite generated over time (which may correspond to some distance in the direction of travel when the automobile 100 is moving), over a range of angles, and/or over a range of subbands. Because each of transceiver $102_n$ and $102_m$ runs off its own clock generators 260 and 280, combining of scene representations from the two transceivers $102_n$ and $102_m$ as described above may require synchronizing their respective clocks. An example process for such synchronizing, which takes advantage of the communication function of the transceivers 102, is described next with reference to FIG. 7.

Figure 7:
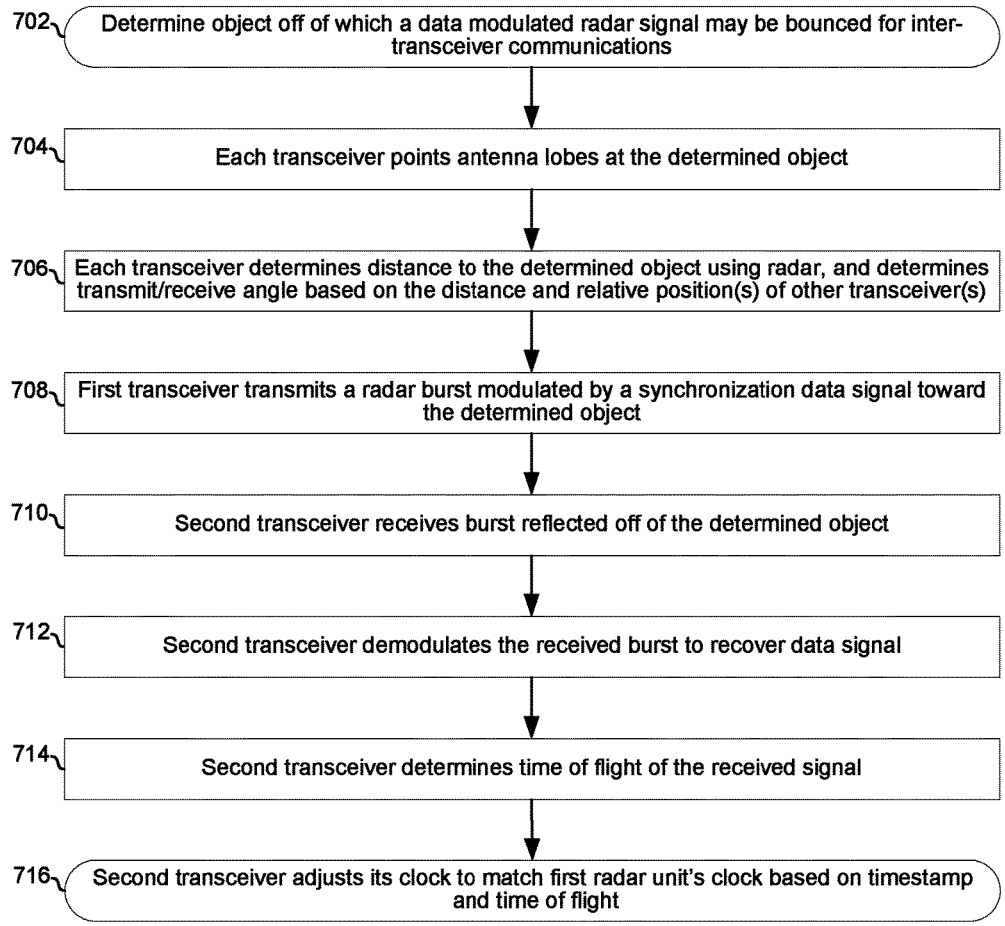
FIG. 7 is a flowchart illustrating an example process for synchronizing the clocks of two multifunctional radar receivers.

FIG. 7 is a flowchart illustrating an example process for synchronizing the clocks of two multifunctional radar receivers.

In block 702, an object suitable for bouncing a data-modulated radar signal from transceiver $102_n$ to transceiver $102_m$ is determined by transceiver $102_n$ and transceiver $102_m$. A suitable object is one off of which sufficiently strong reflections of a radar signal transmitted by transceiver $102_n$ can be received by transceiver $102_m$. In the example of FIG. 6, the object 520 is determined to be a suitable object.

In block 704 the transceiver $102_n$ points transmit and receive lobes at object 520 and the transceiver $102_m$ points transmit and receive lobes at object 520.

In block 706, the transceiver $102_n$, using the reflections represented by arrow 506b, determines the distance between it and object 520. Similarly, the transceiver $102_m$, using the reflections represented by arrow 512b, determines the distance between it and object 520. Given the distances, and the known relative positions of the transceivers $102_n$ and $102_m$ on the vehicle 100, the angles to use for communications between $102_n$ and $102_m$ off of object 520 can be determined.

In block 708, transceiver $102_n$ generates a data signal that carries a representation (e.g., alphanumeric) of the current time according to its clock generator 260 and a representation of the determined distance to object 520. The transceiver $102_n$ then modulates this data signal onto a radar burst which is transmitted at the angle determined in block 706.

In block 710 the modulated radar signal transmitted in block 708 reflects off object 520 and is received at transceiver $102_m$.

In block 712, transceiver $102_m$ demodulates the received signal to recover the data signal carrying the timestamp and the distance from transceiver $102_n$ to object 520.

In block 714, transceiver $102_m$ determines the time of flight of the received burst based on the speed of propagation of the millimeter wave signals and the distances between the object 520 and the transceivers $102_n$ and $102_m$.

In block 716 transceiver $102_m$ adjusts its clock to match the clock $102_n$ based on the received timestamp and the determined time of flight.

Figure 8A:
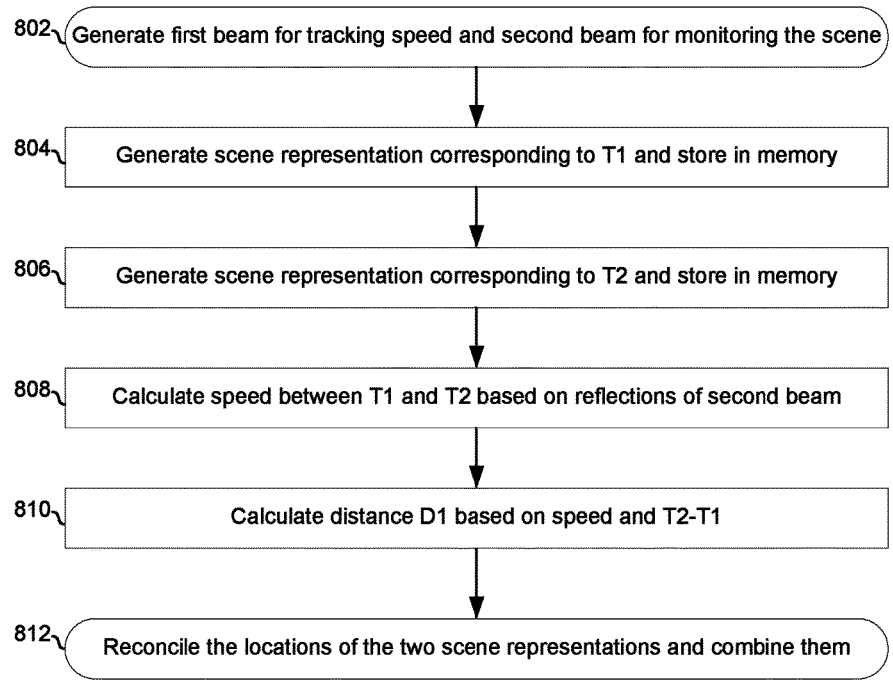
FIGS. 8A and 8B illustrate operation of a multifunction radar transceiver for achieving synthetic aperture.
Figure 8B:
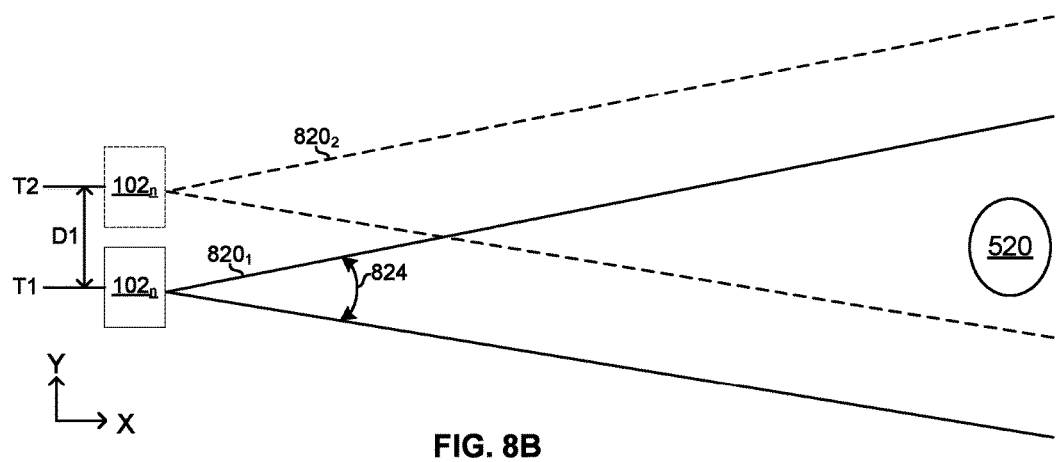

FIGS. 8A and 8B illustrate operation of a multifunction radar transceiver for achieving synthetic aperture.

In block 802 of FIG. 8A, a beamforming matrix of a transceiver $102_n$ is configured to have one lobe pointing at the road in order to track the speed of the automobile 100, and an a second lobe pointing in a direction that is at least slightly different than the direction of travel of the automobile 100. In FIG. 8B, the automobile 100 is traveling in the Y direction and the coverage area of the second lobe spans an angle 824 in the XY plane. The coverage area of the second lobe at time T1 is bounded by $820_1$ and the coverage area of the second lobe at time T2 is bounded by $820_2$.

In block 804, corresponding to time T1, the transceiver $102_n$ receives reflections of the coverage area bounded by $820_1$ and generates a first scene representation from those reflections. The scene representation is stored to memory of transceiver $102_n$.

In block 806, corresponding to time T2, the transceiver $102_n$ receives reflections of the coverage area bounded by $820_2$ and generates a second scene representation from those reflections. The scene representation is stored to memory of transceiver $102_n$.

In block 808, the average speed of the automobile 100 between times T1 and T2 is determined from the returns received via the first lobe In block 810, the average speed calculated in block 808 is used to determine the distance, D1, traveled between times T1 and T2.

In block 812, the locations of the scene representations are reconciled (i.e., the distance D1 is accounted for) before combining to generate a composite scene representation.

In accordance with an example implementation of this disclosure, an automobile 100 comprises a plurality of multifunctional radar transceivers (e.g., $102_n$ and $102_m$). Each of the transceivers is operable to receive reflections of millimeter wave signals transmitted by itself and/or by another one or more of the transceivers and process the received reflections to determine information about environment surrounding the automobile (e.g., to generate a scene representation such as a 2D pixel grid or 3D voxel grid along with metadata describing the objects represented by the grid). A first of the transceivers is operable to express the determined information as a data signal and modulate the data onto a millimeter wave radar signal that it transmits. A second of the transceivers is operable to receive a reflection of the millimeter wave radar signal and demodulate it to recover the data signal. The second transceiver is operable to reconcile a scene representation contained in the data signal with its own scene representation and combine the two representations to generate a composite scene representation. Reconciling the two scene representations may comprise determining the absolute positions of the two scene representations. Reconciling the two scene representations may comprise synchronizing the two transceivers using synchronization data modulated onto millimeter wave radar signals.

In accordance with an example implementation of this disclosure, a first multifunction radar transceiver (e.g., $102_N$) comprises a first transmitter (e.g., $202_N$) and a first receiver (e.g., $204_N$). The transmitter is operable to transmit a first radar burst. The receiver is operable to receive reflections of the first radar burst and reflections of a second radar burst transmitted by a second multifunction radar transceiver. The receiver is operable to generate, based on characteristics of the received reflections of the first radar burst and the received reflections of the second radar burst, a first scene representation. The receiver is operable demodulate the second radar burst to recover a second scene representation. The receiver is operable to combine the first scene representation and the second scene representation to generate a composite scene representation. The receiver may be operable to convey the composite scene representation to the transmitter via a data bus (e.g., 212). The transmitter may be operable to modulate the composite scene-representation onto a third radar burst. The first radar burst may comprise one or more OFDM symbols. The receiver may be operable to determine relative reliabilities of the first scene representation and the second scene representation. The combination of the first scene representation and the second scene representation may involve a weighted combining where weights used are based on the relative reliabilities of the first scene representation and the second scene representation. The receiver may be operable to demodulate the second radar burst to recover a timestamp that corresponds to the time the second radar burst was transmitted by the second multifunction radar receiver. Clock generation circuitry of the first multifunction radar transceiver is calibrated using the timestamp. The first multifunction radar transceiver and second multifunction radar transceiver are located at different locations on a vehicle (e.g., 100). The first multifunction radar transceiver and second multifunction radar transceiver may be communicatively coupled via a communication bus of the vehicle. The first multifunction radar transceiver may be operable to receive or generate data to be communicated to the second multifunction transceiver. The first multifunction radar transceiver may be operable to send the data to the second multifunction transceiver via the data bus if the data has first characteristics. The first multifunction radar transceiver may be operable to modulate the data onto the first radar burst if the data has second characteristics. The characteristics may comprise one or both of: required bandwidth for communication of the data and required latency for communication of the data.

The present method and/or system may be realized in hardware, software, or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set { (x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.). As used herein, "microwave" frequencies range from approximately 300 MHz to 300 GHz and "millimeter wave" frequencies range from approximately 30 GHz to 300 GHz. Thus, the "microwave" band includes the "millimeter wave" band.

What is claimed is:

1. A system comprising:
a first multifunction radar transceiver comprising a first transmitter and a first receiver, wherein:
the transmitter is operable to transmit a first radar burst;
the receiver is operable to:
receive reflections of the first radar burst and reflections of a second radar burst transmitted by a second multifunction radar transceiver;
generate, based on characteristics of the received reflections of the first radar burst and the received reflections of the second radar burst, a first scene representation;
demodulate the second radar burst to recover a second scene representation;
combine the first scene representation and the second scene representation to generate a composite scene representation; and
convey the composite scene representation to the transmitter via a data bus; and
the transmitter is operable to modulate the composite scene-representation onto a third radar burst.

2. The system of claim 1, wherein the first radar burst comprises one or more OFDM symbols.

3. The system of claim 1, wherein:
the receiver is operable to determine relative reliabilities of the first scene representation and the second scene representation; and
the combination of the first scene representation and the second scene representation is a weighted combining where weights used are based on the relative reliabilities of the first scene representation and the second scene representation.

4. The system of claim 1, wherein:
the receiver is operable to demodulate the second radar burst to recover a timestamp that corresponds to a time the second radar burst was transmitted by the second multifunction radar receiver; and
clock generation circuitry of the first multifunction radar transceiver is calibrated using the timestamp.

5. The system of claim 1, wherein the first multifunction radar transceiver and second multifunction radar transceiver are located at different locations on a vehicle.

6. The system of claim 5, wherein the first multifunction radar transceiver and second multifunction radar transceiver are communicatively coupled via a communication bus of the vehicle.

7. The system of claim 5, wherein the first multifunction radar transceiver is operable to:
receive or generate data to be communicated to the second multifunction transceiver;
send the data to the second multifunction transceiver via the data bus if the data has first characteristics; and
modulate the data onto the first radar burst if the data has second characteristics.

8. The system of claim 7, wherein the characteristics comprise one or both of: required bandwidth for communication of the data and required latency for communication of the data.

9. A method comprising:
transmitting, by a transmitter of a first multifunction radar transceiver, a first radar burst;
receiving, by a receiver of the first multifunction radar transceiver, reflections of the first radar burst and reflections of a second radar burst transmitted by a second multifunction radar transceiver;
generating, by the receiver based on characteristics of the received reflections of the first radar burst and the received reflections of the second radar burst, a first scene representation;

demodulating, by the receiver, the second radar burst to recover a second scene representation;
combining, by the receiver, the first scene representation and the second scene representation to generate a composite scene representation;
conveying, by the receiver, the composite scene representation to the transmitter via a data bus; and
modulating, by the transmitter, the composite scene representation onto a third radar burst.

10. The method of claim 9, wherein the first radar burst comprises one or more OFDM symbols.

11. The method of claim 9, comprising:
determining, by the receiver, relative reliabilities of the first scene representation and the second scene representation; and
performing the combining of the first scene representation and the second scene representation using weighted combining where weights used are based on the relative reliabilities of the first scene representation and the second scene representation.

12. The method of claim 9, comprising:
demodulating, by the receiver, the second radar burst to recover a timestamp that corresponds to a time the second radar burst was transmitted by the second multifunction radar receiver; and
calibrating, by circuitry of the first multifunction transceiver, clock generation circuitry of the first multifunction radar transceiver based on the timestamp.

13. The method of claim 9, wherein the first multifunction radar transceiver and second multifunction radar transceiver are located at different locations on a vehicle.

14. The method of claim 13, wherein the first multifunction radar transceiver and second multifunction radar transceiver are communicatively coupled via a communication bus of the vehicle.

15. The method of claim 13, comprising:
receiving or generating, by circuitry of the first multifunction transceiver, data to be communicated to the second multifunction transceiver;
sending, by bus interface circuitry of the first multifunction transceiver, the data to the second multifunction transceiver via a data bus if the data has first characteristics; and
modulating, by the transmitter, data onto the first radar burst if the data has second characteristics.

16. The method of claim 15, wherein the characteristics comprise one or both of: required bandwidth for communication of the data and required latency for communication of the data.

17. A system comprising:
a first multifunction radar transceiver comprising a first transmitter and a first receiver, wherein:
the transmitter is operable to transmit a first radar burst;
the receiver is operable to:
receive reflections of the first radar burst and reflections of a second radar burst transmitted by a second multifunction radar transceiver;
generate, based on characteristics of the received reflections of the first radar burst and the received reflections of the second radar burst, a first scene representation;
demodulate the second radar burst to recover a second scene representation;
combine the first scene representation and the second scene representation to generate a composite scene representation; and
determine relative reliabilities of the first scene representation and the second scene representation; and
the combination of the first scene representation and the second scene representation is a weighted combining where weights used are based on the relative reliabilities of the first scene representation and the second scene representation.

18. The system of claim 17, wherein the receiver is operable to convey the composite scene representation to the transmitter via a data bus.

19. The system of claim 17, wherein the first radar burst comprises one or more OFDM symbols.

20. The system of claim 17, wherein:
the receiver is operable to demodulate the second radar burst to recover a timestamp that corresponds to a time the second radar burst was transmitted by a second multifunction radar receiver; and
clock generation circuitry of the first multifunction radar transceiver is calibrated using the timestamp.

21. The system of claim 17, wherein the first multifunction radar transceiver and second multifunction radar transceiver are located at different locations on a vehicle.

22. The system of claim 21, wherein the first multifunction radar transceiver and second multifunction radar transceiver are communicatively coupled via a communication bus of the vehicle.

23. The system of claim 21, wherein the first multifunction radar transceiver is operable to:
receive or generate data to be communicated to the second multifunction transceiver;
send the data to the second multifunction transceiver via the data bus if the data has first characteristics; and
modulate the data onto the first radar burst if the data has second characteristics.

24. The system of claim 23, wherein the characteristics comprise one or both of: required bandwidth for communication of the data and required latency for communication of the data.

25. A method comprising:
transmitting, by a transmitter of a first multifunction radar transceiver, a first radar burst;
receiving, by a receiver of the first multifunction radar transceiver, reflections of the first radar burst and reflections of a second radar burst transmitted by a second multifunction radar transceiver;
generating, by the receiver based on characteristics of the received reflections of the first radar burst and the received reflections of the second radar burst, a first scene representation;
demodulating, by the receiver, the second radar burst to recover a second scene representation;
combining, by the receiver, the first scene representation and the second scene representation to generate a composite scene representation;
demodulating, by the receiver, the second radar burst to recover a timestamp that corresponds to a time the second radar burst was transmitted by the second multifunction radar receiver; and
calibrating, by circuitry of the first multifunction transceiver, clock generation circuitry of the first multifunction radar transceiver based on the timestamp.

26. The method of claim 25, wherein the receiver is operable to convey the composite scene representation to the transmitter via a data bus.

27. The method of claim 25, wherein the first radar burst comprises one or more OFDM symbols.

28. The method of claim 25, comprising:
- demodulating, by the receiver, the second radar burst to recover a timestamp that corresponds to the time the second radar burst was transmitted by the second multifunction radar receiver; and
- calibrating, by circuitry of the first multifunction transceiver, clock generation circuitry of the first multifunction radar transceiver based on the timestamp.

29. The method of claim 25, wherein the first multifunction radar transceiver and second multifunction radar transceiver are located at different locations on a vehicle.

30. The method of claim 29, wherein the first multifunction radar transceiver and second multifunction radar transceiver are communicatively coupled via a communication bus of the vehicle.

31. The method of claim 29, comprising:
- receiving or generating, by circuitry of the first multifunction transceiver, data to be communicated to the second multifunction transceiver;
- sending, by bus interface circuitry of the first multifunction transceiver, the data to the second multifunction transceiver via a data bus if the data has first characteristics; and
- modulating, by the transmitter, data onto the first radar burst if the data has second characteristics.

32. The method of claim 31, wherein the characteristics comprise one or both of: required bandwidth for communication of the data and required latency for communication of the data.

33. A system comprising:
a first multifunction radar transceiver comprising a first transmitter and a first receiver, wherein:
- the transmitter is operable to transmit a first radar burst;
- the receiver is operable to:
  - receive reflections of the first radar burst and reflections of a second radar burst transmitted by a second multifunction radar transceiver;
  - generate, based on characteristics of the received reflections of the first radar burst and the received reflections of the second radar burst, a first scene representation;
  - demodulate the second radar burst to recover a second scene representation;
  - combine the first scene representation and the second scene representation to generate a composite scene representation;
  - demodulate the second radar burst to recover a timestamp that corresponds to a time the second radar burst was transmitted by the second multifunction radar receiver; and
  - calibrate clock generation circuitry of the first multifunction radar transceiver using the timestamp.

34. The system of claim 33, wherein the receiver is operable to convey the composite scene representation to the transmitter via a data bus.

35. The system of claim 33, wherein the first radar burst comprises one or more OFDM symbols.

36. The system of claim 33, wherein the first multifunction radar transceiver and second multifunction radar transceiver are located at different locations on a vehicle.

37. The system of claim 36, wherein the first multifunction radar transceiver and second multifunction radar transceiver are communicatively coupled via a communication bus of the vehicle.

38. The system of claim 36, wherein the first multifunction radar transceiver is operable to:
- receive or generate data to be communicated to the second multifunction transceiver;
- send the data to the second multifunction transceiver via the data bus if the data has first characteristics; and
- modulate the data onto the first radar burst if the data has second characteristics.

39. The system of claim 38, wherein the characteristics comprise one or both of: required bandwidth for communication of the data and required latency for communication of the data.

40. A method comprising:
- transmitting, by a transmitter of a first multifunction radar transceiver, a first radar burst;
- receiving, by a receiver of the first multifunction radar transceiver, reflections of the first radar burst and reflections of a second radar burst transmitted by a second multifunction radar transceiver;
- generating, by the receiver based on characteristics of the received reflections of the first radar burst and the received reflections of the second radar burst, a first scene representation;
- demodulating, by the receiver, the second radar burst to recover a second scene representation;
- combining, by the receiver, the first scene representation and the second scene representation to generate a composite scene representation;
- demodulating, by the receiver, the second radar burst to recover a timestamp that corresponds to a time the second radar burst was transmitted by the second multifunction radar receiver; and
- calibrating, by circuitry of the first multifunction transceiver, clock generation circuitry of the first multifunction radar transceiver based on the timestamp.

41. The method of claim 40, wherein the receiver is operable to convey the composite scene representation to the transmitter via a data bus.

42. The method of claim 40, wherein the first radar burst comprises one or more OFDM symbols.

43. The method of claim 40, wherein the first multifunction radar transceiver and second multifunction radar transceiver are located at different locations on a vehicle.

44. The method of claim 43, wherein the first multifunction radar transceiver and second multifunction radar transceiver are communicatively coupled via a communication bus of the vehicle.

45. The method of claim 43, comprising:
- receiving or generating, by circuitry of the first multifunction transceiver, data to be communicated to the second multifunction transceiver;
- sending, by bus interface circuitry of the first multifunction transceiver, the data to the second multifunction transceiver via a data bus if the data has first characteristics; and
- modulating, by the transmitter, data onto the first radar burst if the data has second characteristics.

46. The method of claim 43, wherein the characteristics comprise one or both of: required bandwidth for communication of the data and required latency for communication of the data.

47. A system comprising:
a first multifunction radar transceiver comprising a first transmitter and a first receiver, wherein:
- the transmitter is operable to transmit a first radar burst;
- the receiver is operable to:
  - receive reflections of the first radar burst and reflections of a second radar burst transmitted by a second multifunction radar transceiver;

generate, based on characteristics of the received reflections of the first radar burst and the received reflections of the second radar burst, a first scene representation;

demodulate the second radar burst to recover a second scene representation; and combine the first scene representation and the second scene representation to generate a composite scene representation;

wherein the first multifunction radar transceiver and second multifunction radar transceiver are located at different locations on a vehicle; and the first multifunction radar transceiver is operable to:

receive or generate data to be communicated to the second multifunction transceiver;

send the data to the second multifunction transceiver via the data bus if the data has first characteristics; and modulate the data onto the first radar burst if the data has second characteristics.

48. The system of claim 47, wherein the receiver is operable to convey the composite scene representation to the transmitter via the data bus.

49. The system of claim 47, wherein the first radar burst comprises one or more OFDM symbols.

50. The system of claim 47, wherein the first multifunction radar transceiver and second multifunction radar transceiver are communicatively coupled via a communication bus of the vehicle.

51. The system of claim 50, wherein the characteristics comprise one or both of: required bandwidth for communication of the data and required latency for communication of the data.

52. A method comprising:

transmitting, by a transmitter of a first multifunction radar transceiver, a first radar burst;

receiving, by a receiver of the first multifunction radar transceiver, reflections of the first radar burst and reflections of a second radar burst transmitted by a second multifunction radar transceiver;

generating, by the receiver based on characteristics of the received reflections of the first radar burst and the received reflections of the second radar burst, a first scene representation;

demodulating, by the receiver, the second radar burst to recover a second scene representation;

combining, by the receiver, the first scene representation and the second scene representation to generate a composite scene representation;

receiving or generating, by circuitry of the first multifunction transceiver, data to be communicated to the second multifunction transceiver;

sending, by bus interface circuitry of the first multifunction transceiver, the data to the second multifunction transceiver via a data bus if the data has first characteristics; and modulating, by the transmitter, data onto the first radar burst if the data has second characteristics, wherein the first multifunction radar transceiver and second multifunction radar transceiver are located at different locations on a vehicle.

53. The method of claim 52, wherein the receiver is operable to convey the composite scene representation to the transmitter via the data bus.

54. The method of claim 52, wherein the first radar burst comprises one or more OFDM symbols.

55. The method of claim 52, wherein the first multifunction radar transceiver and second multifunction radar transceiver are communicatively coupled via a communication bus of the vehicle.

56. The method of claim 52, wherein the characteristics comprise one or both of: required bandwidth for communication of the data and required latency for communication of the data.

* * * * *